June 30, 1925.
E. GADDA
HARROW
Filed Aug. 2, 1923
1,544,442
5 Sheets-Sheet 3

Inventor
E. Gadda.
By
Attorney

June 30, 1925.

E. GADDA

HARROW

Filed Aug. 2, 1923    5 Sheets-Sheet 5

Inventor

E. Gadda

Patented June 30, 1925.

1,544,442

UNITED STATES PATENT OFFICE.

ERIK GADDA, OF SILVERTON, OREGON.

HARROW.

Application filed August 2, 1923. Serial No. 655,312.

*To all whom it may concern:*

Be it known that I, ERIK GADDA, a citizen of Finland, residing at Silverton, in the county of Marion and State of Oregon, have invented certain new and useful Improvements in Harrows; and I do hereby declare the following to be a full, clear, and exact description of the invention, such as will enable others skilled in the art to which it appertains to make and use the same.

The invention relates to agricultural implements and to such as are designed to prepare the soil for the sowing of seed and has for its object the provision of a harrow of sectional formation and embodying rotary toothed bars, the sections being movable to conform to the surface of rolling ground and the toothed bars being adjustable vertically to clear the ground and adjustable angularly to vary the relative action of the teeth.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Figure 1:
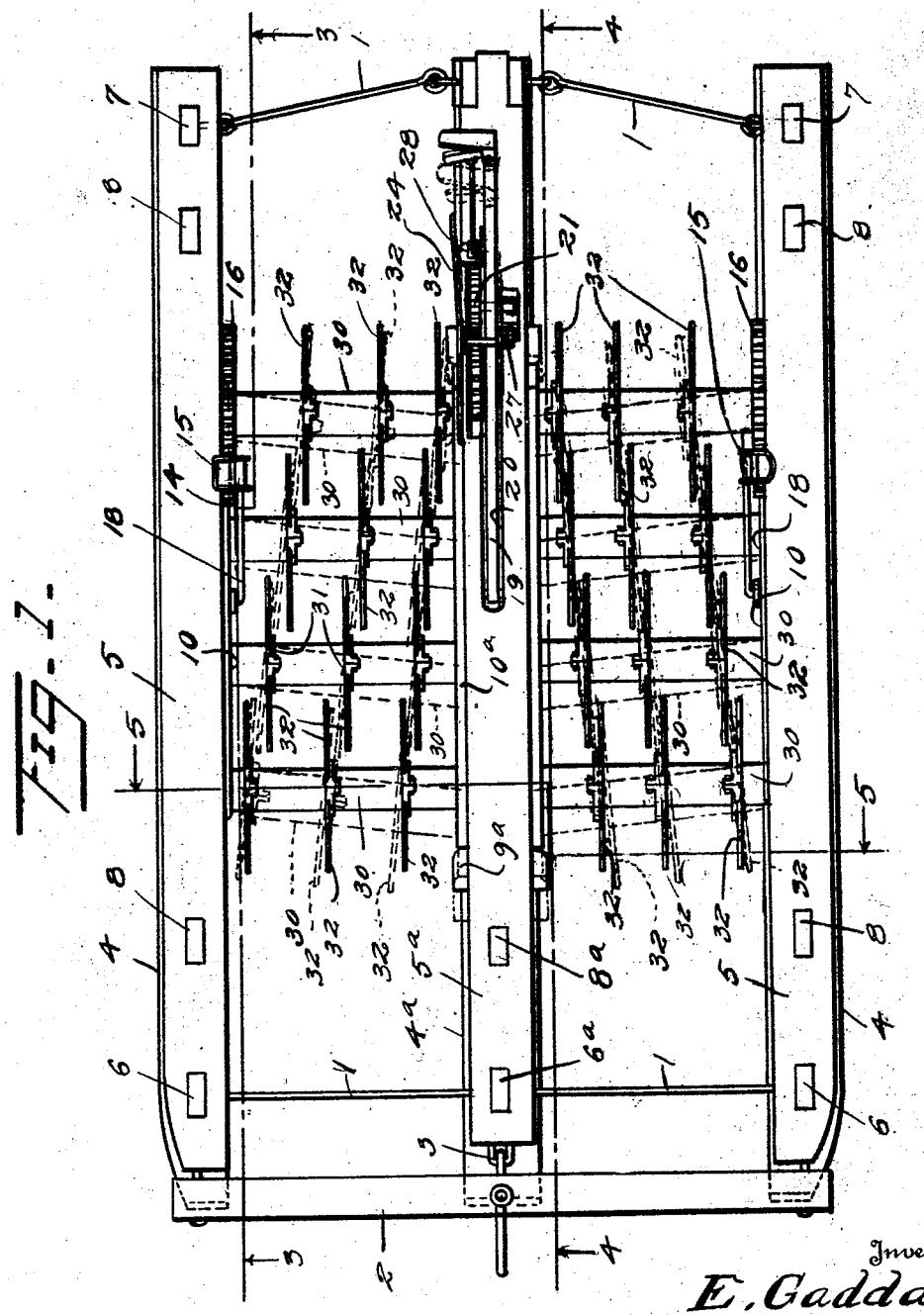
Figure 2:
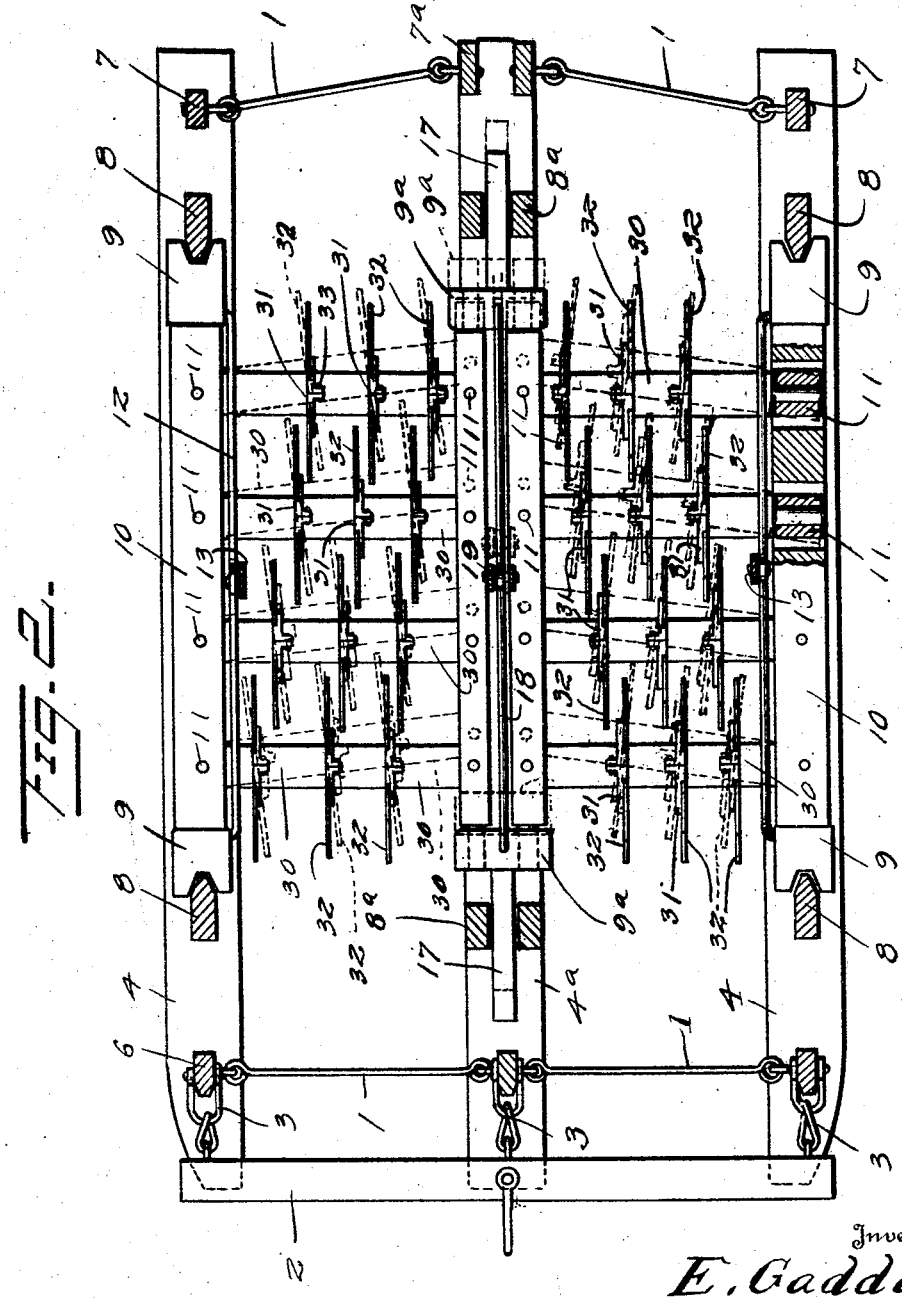
Figure 3:
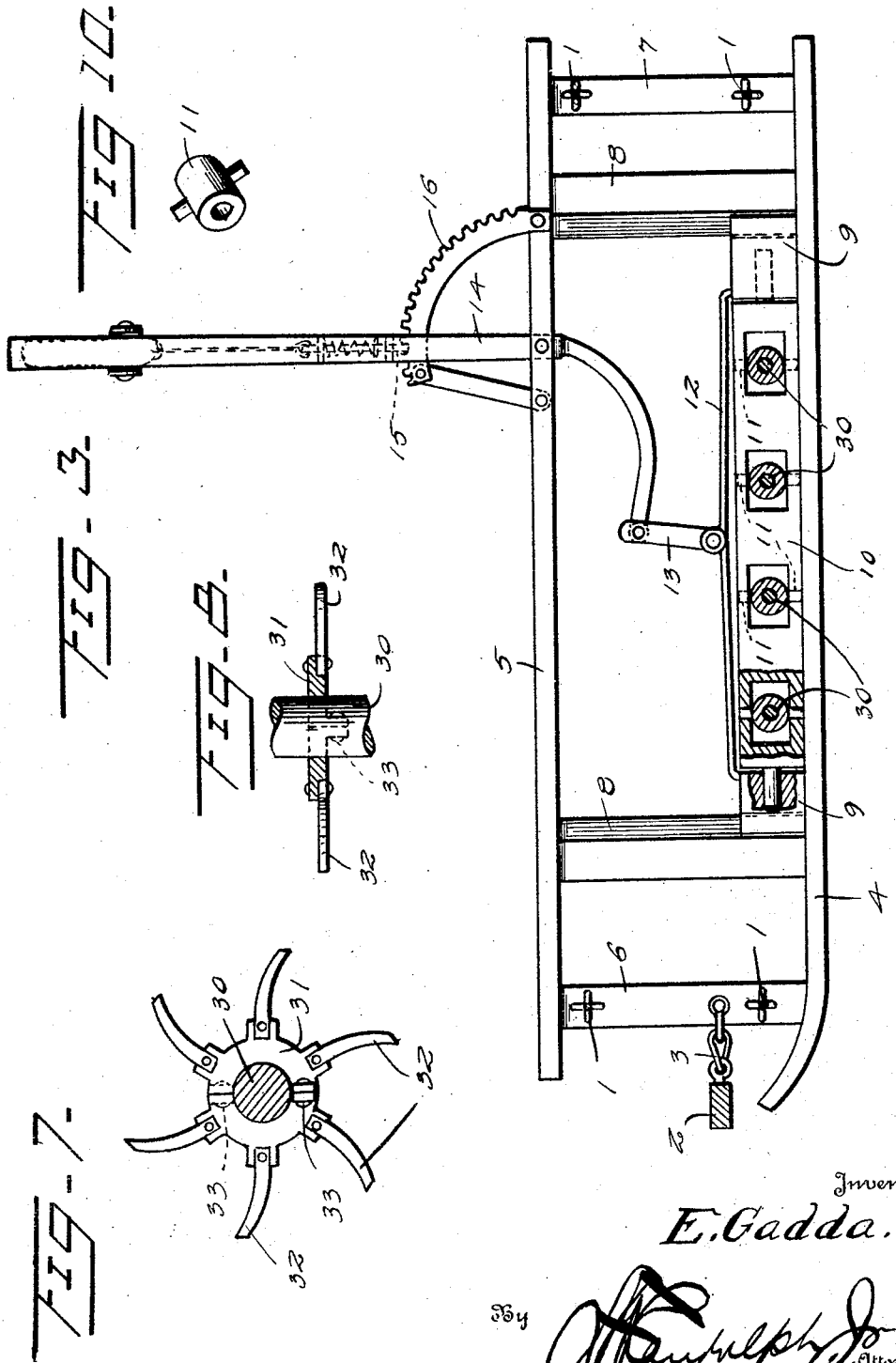
Figure 4:
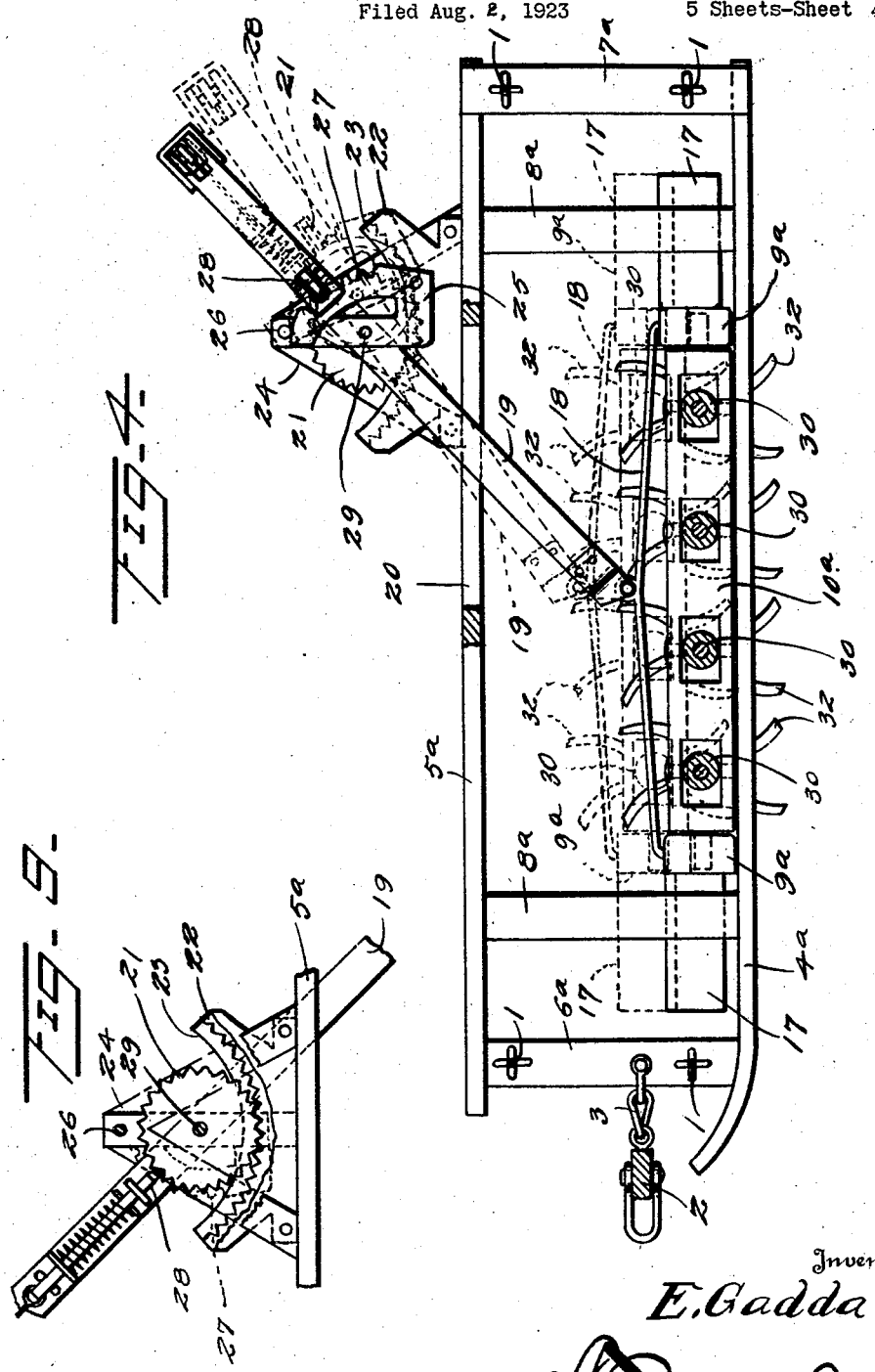

Referring to the accompanying drawings forming a part of the application:

Figure 1 is a top plan view of a harrow embodying the invention, showing an angular adjustment of the toothed bars, Figure 2 is a horizontal sectional view of the harrow, the dotted lines showing a different angular adjustment of the toothed bars, Figure 3 is a vertical longitudinal section on the line 3—3 of Figure 1, looking in the direction of the arrows, Figure 4 is a vertical longitudinal section on the line 4—4 of Figure 1, looking in the direction of the arrows, Figure 5 is a cross section on the line 5—5 of Figure 1, looking towards the front as designated by the arrows, Figure 6 is a rear view of the harrow, Figure 7 is a sectional view of a toothed bar, Figure 8 is a detail sectional view of a portion of a toothed bar, Figure 9 is a detail view of a portion of the lever for adjusting the inner ends of the toothed bars, showing the means for securing the same in the required adjusted position, and Figure 10 is a detail view of a bearing for a toothed bar.

Corresponding and like parts are referred to in the following description and designated in the several views of the drawings by like reference characters.

The harrow comprises a middle and side frames of similar construction which are disposed in parallel and vertical position and connected at opposite ends by means of upper and lower links 1 which have a universal joint connection at their ends with the respective frames, whereby the latter are free to move in every direction to conform to the surface of the ground and equalize stress and strain. A draft bar 2 has a clevis connection 3 with each of the frames and is adapted to have the draft hitched centrally thereto in any preferred way.

The side frames are of like formation, each comprising a runner 4, an upper bar 5, front and rear uprights 6 and 7 connecting opposite ends of the parts 4 and 5 and front and rear guides 8 which likewise serve to connect the parts 4 and 5. Blocks 9 are in cooperative relation with the guides 8 and bars 10 are journaled at their ends in the blocks 9 and are retained in place thereby. Bearings 11 are pivotally mounted in openings formed in the bars 10 and are provided with vertically alined trunnions which are pivoted to the bar 10 above and below the openings formed therein. A bail 12 is in engagement at its ends with the blocks 9 and is connected centrally with the lower end of a lever 14 by means of a link 13, said lever being provided with the usual hand latch 15 which is in cooperative relation with a toothed segment 16 whereby to hold the lever 14 in the required adjusted position. Movement of the upper end of the lever 14 effects vertical adjustment of the bar 10, whereby the same may be raised or lowered, as required.

The middle frame comprises a runner $4^a$, an upper bar $5^a$, front and rear uprights $6^a$ and $7^a$ respectively, and front and rear guides $8^a$. The front upright $6^a$ consists of a single bar but the rear upright $7^a$ and the guides $8^a$ comprise companion bars which are transversely spaced. Slats $9^a$ have stems 17 which enter the spaces formed between the bars comprising the guides 8ª. Bars 10ª are journaled at their ends in the blocks 9ª and have openings corresponding with the openings of the bars 10 in which are pivotally mounted bearings 11. A bail 18 is connected at its ends to the blocks 9ª and intermediate its ends to the lower end of a lever 19 which is mounted upon the upper bar 5ª and passes through a longitudinal slot 20 formed therein. A toothed wheel 21 is provided at one side of the lever 19 and cooperates with a toothed guide 22 mounted upon the bar 5ª. The toothed guide 22 is curved throughout its length and is provided at opposite sides with flanges 23 which constitute guards to prevent lateral displacement of the toothed wheel 21 and maintain it in engagement with the toothed guide 22. A standard 24 is attached to the bar 5ª and a bracket 25 is pivoted at its upper end to the top portion thereof, as indicated at 26, and includes a toothed bar 27. A latch 28 carried by the lever 19 is adapted to cooperate with the toothed wheel 21 and the toothed bar 27, whereby to secure the lever 19 and said parts in the required adjusted position. The bracket 25 is also pivotally connected to the lever 19, as indicated at 29, said pivot also supporting and pivotally connecting the toothed wheel 21 to the lever. The lever 19 has a twofold movement, the one about the pivot 29 and the other about the pivot 26. In the latter movement, the lever 19, bracket 25 and toothed wheel 21 move together and these parts are stationary when the lever 19 moves about the pivot 29.

A plurality of bars 30 are disposed upon opposite sides of the middle frame and are journaled in the bearings 11 applied to the longitudinal bars 10 and 10ª. Each of the bars 30 is provided with a plurality of hubs 31 and teeth 32 attached to the hubs. The hubs 31 are of sectional formation and the sections are adapted to be fitted about the bar 30 and clamped thereto. The hub sections have lateral extensions which are pierced to receive suitable fastening means 33 whereby the sections are made secure and clamped to the bars 30.

In practice, the several sections comprising the harrow have a relative limited play to admit of their ready conformation to the surface of rolling ground. Manipulation of the levers 14 and 19 admit of the bars 10 and 10ª being moved vertically, whereby the harrow teeth may be lifted clear of the ground or adjusted to any depth, as required. When the harrow teeth are elevated so as to clear the ground, the implement may be turned at the end of a row or transported from one place to another without contact of the teeth with the ground. When the lever 19 is moved forwardly or rearwardly with the bracket 25 and toothed wheel 21, the toothed bars 30 may be inclined forwardly or rearwardly, as indicated by the dotted lines in Figures 1 and 2 and this adjustment may be effected without vertical movement of the bars 10ª. When the harrow teeth are to be lifted, it is necessary to operate the three levers 14 and 19. When the bars 10ª are moved longitudinally, the stems 17 of the blocks 9ª move in the spaces between the companion bars of the guides 8ª. These stems 17 are also adapted to move vertically in the guides 8ª. The inner vertical edges of the guides 8 are of V-form and the outer faces of the blocks 9 are formed with corresponding V-grooves to cooperate with the V-shaped edges of the guides 8.

What is claimed is:

1. In an agricultural implement of the character specified, a plurality of vertically disposed frames, each of said frames having a runner with its lower edge engaging the ground, upper and lower links connecting the frames and pivoting them together for universal movement, and earth treating members adjustably mounted upon the frames.

2. In an agricultural implement of the character specified, a plurality of vertically disposed frames, each of said frames having a runner with its lower edge engaging the ground, upper and lower links connecting the frames and pivoting them together for universal movement, earth treating members mounted upon the frames, and means for raising or lowering the earth treating members to clear the ground or regulate their depth of action.

3. In an agricultural implement of the character specified, a plurality of vertically disposed frames, each of said frames having a runner with its lower edge engaging the ground, upper and lower links connecting the frames and pivoting them together for universal movement, earth treating members mounted upon the frames, and means for adjusting the relative inclination of the earth treating devices both forwardly and rearwardly.

4. In an agricultural implement of the character specified, a plurality of vertically disposed frames, each of said frames having a runner with its lower edge engaging the ground, upper and lower links connecting the frames and pivoting them together for universal movement, earth treating members mounted upon the frames, means for raising or lowering the earth treating devices, and independent means for changing the relative inclination thereof both forwardly and rearwardly.

5. In an agricultural implement of the character specified, a frame, a member adjustable longitudinally and vertically and forming supporting means for earth treating devices, a lever for effecting the twofold adjustment of said member, a standard for mounting said lever, a toothed bracket pivotally mounted on said standard and pivotally secured to said lever, a toothed wheel journaled on said lever and bracket, a toothed segment engaging said toothed wheel, and a detent on said lever and engaging said toothed wheel and bracket.

6. In an agricultural implement of the character specified, a frame, a member forming supporting means for earth-treating devices and mounted both for longitudinal and vertical adjustment, an operating lever having connection with said member and having both a longitudinal and a pivotal movement, and means for securing said lever and member in the required adjusted position.

7. In an agricultural implement of the character specified, a frame, a member forming supporting means for earth-treating devices and mounted both for longitudinal and vertical adjustment, an operating lever having connection with said member and having both a longitudinal and a pivotal movement, a toothed wheel carried by the lever, a curved toothed bar coacting with said toothed wheel, a pivoted bracket having said lever pivoted thereto in line with the axis of said toothed wheel and having a portion toothed, and a latch mounted upon the lever and adapted to engage both the toothed wheel and the toothed portion of said pivoted bracket.

8. An agricultural implement comprising a middle and side frames, means connecting said frames to admit of a limited relative play, front and rear blocks mounted upon the frames and adapted to move vertically, the blocks applied to the middle frame having an additional longitudinal movement, longitudinal bars journaled in said blocks and movable therewith and forming supporting means for earth-treating devices, levers mounted upon the side frames and having connection with the blocks to effect vertical adjustment thereof, a lever mounted upon the middle frame and having connection with the blocks thereof to adjust the same both longitudinally and vertically, a toothed wheel carried by the middle lever, a toothed bar mounted upon the middle frame and coacting with said toothed wheel, a bracket pivotally mounted upon the middle frame and having pivotal connection with the middle lever and having a portion toothed, and a latch carried by the middle lever and adapted to cooperate with the toothed wheel and the toothed portion of the pivoted bracket.

In testimony whereof I affix my signature in presence of two witnesses.

ERIK GADDA.

Witnesses:
CARL H. GOSSHIE,
WANDA GOSSHIE.